Figure 1:
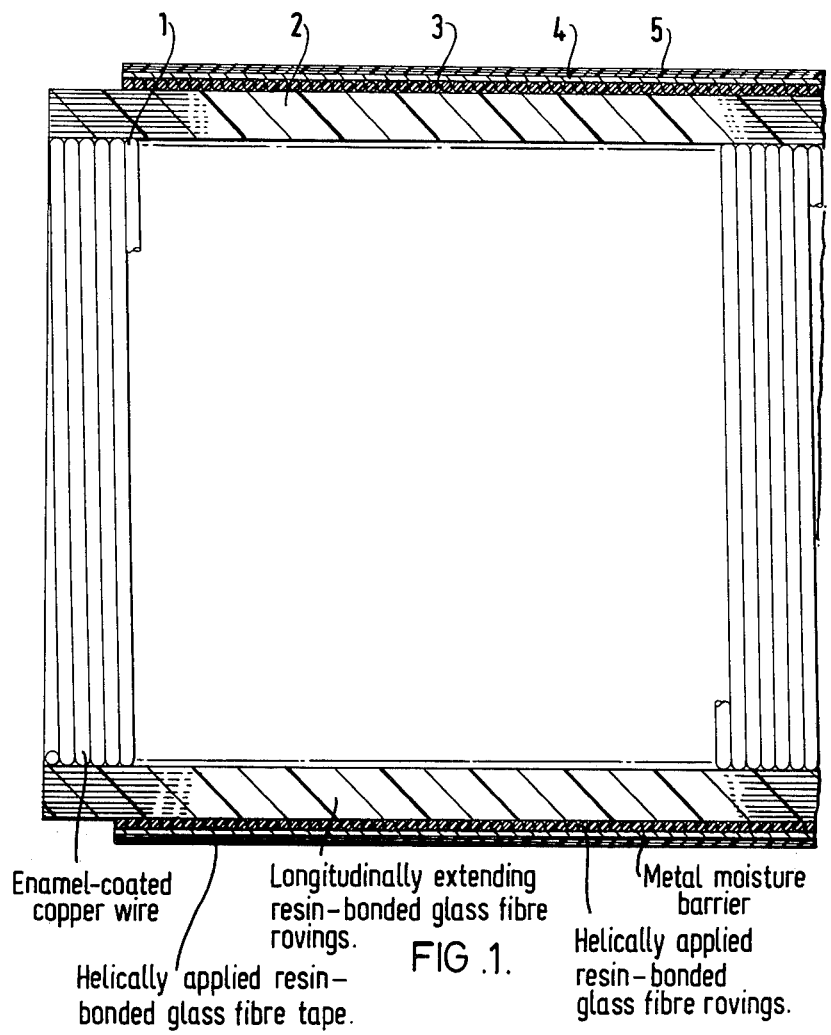

United States Patent [19]

Moore et al.

[11] 4,066,987
[45] Jan. 3, 1978

[54] ELECTROMAGNETIC WAVEGUIDES

[75] Inventors: Alexander Joseph Moore, Marlow; David Alexander Taylor, Kenton; David James Greene, Harrow, all of England

[73] Assignee: BICC Limited, London, England

[21] Appl. No.: 561,979

[22] Filed: Mar. 25, 1975

[30] Mar. 29, 1974 United Kingdom .......... 14175/74

[51] Int. Cl.² .............................................. H01P 3/12
[52] U.S. Cl. ..................................... 333/95 R; 29/600
[58] Field of Search ....................................... 333/95 R

[56] References Cited

U.S. PATENT DOCUMENTS

| | | | |
|---|---|---|---|
| 2,848,695 | 8/1958 | Pierce | 333/95 R |
| 2,966,643 | 12/1960 | Kohman et al. | 333/95 R |
| 3,056,710 | 10/1962 | Rose | 333/95 R X |
| 3,121,206 | 2/1964 | Mandel | 333/95 R |
| 3,771,078 | 11/1973 | Kidner et al. | 333/95 R |

Primary Examiner—Paul L. Gensler
Attorney, Agent, or Firm—Buell, Blenko & Ziesenheim

[57] ABSTRACT

In a rigid electromagnetic waveguide, reinforcing elements (e.g. glass fibres) or one or more layers of the reinforcing wall extend lengthwise, preferably parallel to the waveguide axis, throughout the length of the waveguide. Preferably in the outermost layer or in outer layers of the reinforcing wall reinforcing elements extend helically about the waveguide. The longitudinally extending reinforcing elements are preferably applied to a stationary mandrel, which may be arranged vertically, through an annular guide which travels to and fro along the length of the mandrel, the elements being retained at the start and finish of each pass of the guide. The resistance of the waveguide to bending when supported horizontally is increased.

6 Claims, 2 Drawing Figures

Enamel-coated copper wire

Helically applied resin-bonded glass fibre tape.

Longitudinally extending resin-bonded glass fibre rovings.

Metal moisture barrier

Helically applied resin-bonded glass fibre rovings.

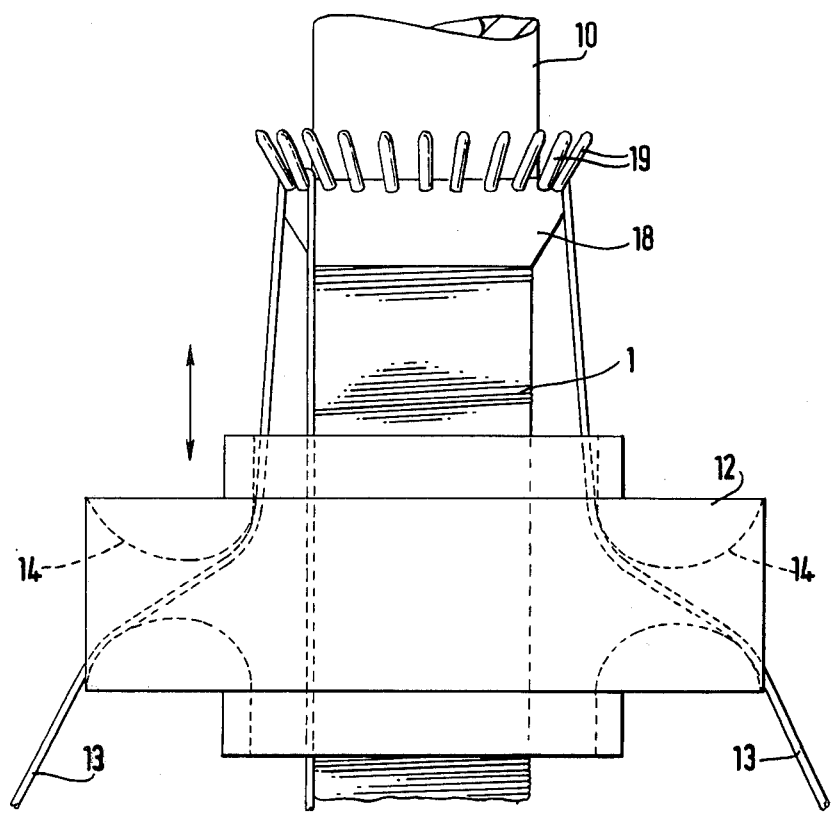
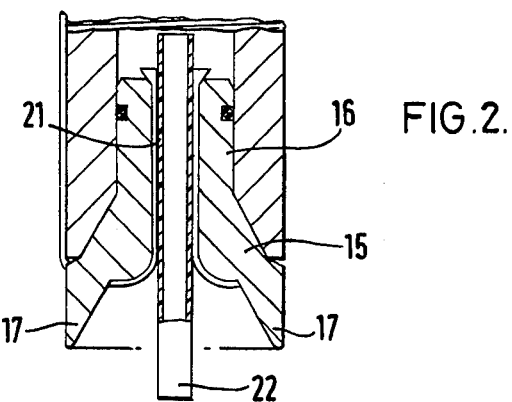
FIG.2.

ELECTROMAGNETIC WAVEGUIDES

This invention relates to electromagnetic waveguides for use in effecting communication over long distances by conveying microwave signals along the waveguides arranged continuously along an appropriate transmission path.

The invention is particularly concerned with substantially rigid electromagnetic waveguides of the kind including a circumferential electrically conductive layer and, surrounding the electrically conductive layer, a reinforcing wall comprising at least one layer of glass fibre or other suitable elongate reinforcing element bonded with resin. For convenience, all such glass fibres and other elongate reinforcing elements will hereinafter be included in the generic expression "reinforcing elements".

It is an object of the present invention to provide an improved electromagnetic waveguide of the aforesaid kind which, when arranged substantially horizontally and supported at spaced positions, is substantially more resistant to bending, and hence substantially more rigid and less prone to distortion, than presently known electromagnetic waveguides of this kind.

According to the invention, reinforcing elements of said layer or of one or more than one of said layers of the reinforcing wall extend lengthwise, preferably substantially parallel to the axis of the waveguide, throughout substantially the whole length of the waveguide.

As indicated, reinforcing elements of said layer or layers preferably extend substantially parallel to the axis of the waveguide but the invention includes waveguides in which reinforcing elements extend lengthwise with a long lay, the expression "a long lay" being used in this specification to mean that reinforcing elements do not make more than two helical turns per meter of a manufactured section of waveguide.

Preferably in the outermost layer or in outer layers of the reinforcing wall reinforcing elements extend helically about the waveguide, thereby to bind the underlying longitudinally extending reinforcing elements to the circumferential electrically conductive layer. Where there are two or more layers of helically wound reinforcing elements the reinforcing elements of adjacent layers preferably have directions of lay of opposite hand.

The reinforcing elements will generally, but not necessarily, comprise glass fibres but, in some instances, at least some of the reinforcing elements may comprise wires, tapes of suitable reinforcing material or tapes in which, or on a surface of which, wires, fibres, filaments or other elongate reinforcing elements are secured.

The circumferential electrically conductive layer may take any convenient form but preferably it comprises a layer of closely wound helical turns of wire of circular or non-circular cross-section or a continuous circumferential coating of electrially conductive metal or metal alloy. The wire may have a covering layer of insulating material or it may be bare. Where the wire is bare or the electrically conductive layer is a coating of metal or metal alloy the internal surface of the electrically conductive layer so formed is preferably lined with a layer of insulating material, for instance a polymeric insulating material. In all cases, but especially in the case where the conductive layer comprises a layer of helically wound wire, the conductive layer may be immediately surrounded by a layer or layers of lossy material. Such lossy layer or layers may be constituted by the incorporation of graphite or other electrically conductive material in the resin of at least the innermost layer or inner layers of the reinforcing wall.

The reinforcing wall of the waveguide is preferably itself surrounded by a moisture barrier, for instance a thin metal jacket. An outermost covering preferably surrounds, and provides mechanical protection for, the moisture barrier; preferably the outermost covering comprises a layer or layers of resin bonded fibrous tape.

The invention also includes a method of manufacturing the electromagnetic waveguide as hereinbefore described, which method comprises the steps of feeding a plurality of reinforcing elements through an annular guide and securing the leading ends of the elements to one end of a substantially rigid mandrel on which has been formed a circumferential electrically conductive layer with or without at least one superposed layer of resin-impregnated reinforcing elements, the annular guide having an internal diameter greater than the external diameter of, and being arranged substantially coaxial with, the mandrel; effecting relative longitudinal movement between the annular guide and the mandrel in such a direction that a layer of longitudinally extending reinforcing elements is applied directly or indirectly to the electrically conductive layer on the mandrel and retaining the reinforcing elements at the other end of the mandrel; cutting the reinforcing elements extending between the annular guide and the mandrel and, where necessary, impregnating the layer or layers of reinforcing elements with a resin; and curing said layer or layers of resin-impregnated reinforcing elements.

Preferably, after the first layer of longitudinally extending reinforcing elements has been applied and retained at said other end of the mandrel, relative longitudinal movement between the annular guide and the mandrel is effected in the opposite direction to apply to the mandrel a second layer of longitudinally extending reinforcing elements; the reinforcing elements are retained at the first-mentioned end of the mandrel; and the first or both of the last two steps is or are repeated if or as required to build up one or more than one additional layer of longitudinally extending reinforcing elements, the reinforcing elements finally being cut, after the last layer or reinforcing elements has been applied and the reinforcing elements retained at one end of the mandrel.

Relative longitudinal movement between the annular guide and the mandrel is preferably effected by moving the guide.

To reduce as far as possible any tendency for tension in reinforcing elements to vary along the length of the mandrel which, in some circumstances, may be the case where the mandrel is supported with its axis substantially horizontal, whilst the reinforcing elements are applied to the mandrel it is preferably supported with its axis substantially vertical.

It is preferred to apply the longitudinal extending reinforcing elements to the mandrel in the unimpregnated state and, as indicated, subsequently to impregnate these layers, but it is to be understood that the method does not exclude the use of reinforcing elements pre-impregnated with resin.

Reinforcing elements are preferably retained at one end or each end of the mandrel by guiding the reinforcing elements approaching that end between adjacent projections of a plurality of circumferentially spaced projections positioned at said end and effecting relative rotational movement between the mandrel and the annular guide to such an extent that the reinforcing elements when guided in the opposite direction are looped over said projections and pass between other adjacent projections of said plurality of projections. Relative rotational movement between the mandrel and said annular guide is effected by partially rotating the mandrel about its axis with respect to the guide. Such partial rotation of the mandrel may be effected throughout the passage of the annular guide from one end of the mandrel to the other.

Preferably, before the layer or layers of resin-impregnated longitudinally extending reinforcing elements are cured, at least one layer of helically wound reinforcing elements is applied over the layer or layers of longitudinally extending reinforcing elements; where two or more helically wound layers are applied the directions of lay of adjacent layers are preferably of opposite hand. If desired, between any two layers of longitudinally extending reinforcing elements so formed, one or more than one layer of helically wound reinforcing elements may be applied. The reinforcing elements that are helically wound about the mandrel are preferably impregnated with resin before they are wound around the mandrel.

Although it is preferred to cure the layers of resin-impregnated reinforcing elements after all the layers have been applied, where a reinforcing wall of substantial thickness is being formed, one or more than one intermediate curing step may be employed.

The mandrel is preferably of tubular form or has a blind bore in at least one of its ends and the leading ends of the longitudinally extending reinforcing elements are preferably secured to one end or to said end of the mandrel by threading them through a tubular plug, so securing these ends in the plug that the elements cannot be pulled back through the plug, and then inserting the plug into said end of the mandrel.

The invention further includes apparatus for use in manufacturing our improved electromagnetic waveguide by the above described method, which apparatus comprises means for supporting an elongate mandrel at one or both of its ends; an annular guide for the passage of a plurality of circumferentially spaced reinforcing elements through the peripheral wall of the guide, which guide is arranged coaxially with a mandrel when supported in the apparatus and which has an internal diameter greater than the external diameter of the mandrel to be supported; and means associated with the mandrel-support means and/or with the annular guide for effecting relative longitudinal movement between the mandrel and the guide in such a way that, in effect, the guide can be caused to traverse from one end of the mandrel to the other to apply a layer of longitudinally extending reinforcing elements on the mandrel.

The apparatus preferably also includes at each end of the mandrel, means for retaining longitudinally extending reinforcing elements at said end at the end of a pass of the annular guide. Preferably the reinforcing element-retaining means at each end of the mandrel comprises a plurality of circumferentially spaced projections about which longitudinally extending reinforcing elements can be looped. At least one of the reinforcing element-retaining means may comprise a collar which is detachably secured to the mandrel and from which a plurality of circumferentially spaced fingers project. At least one of the reinforcing element-retaining means may comprise a tubular plug which, at one end, is shaped to fit in a tubular end of a mandrel and, at the other end, has projecting from it a plurality of circumferentially spaced fingers.

The annular guide preferably has a plurality of circumferentially spaced apertures extending transversely through the peripheral wall of the guide through which reinforcing elements can pass on to a mandrel.

Preferably the mandrel-support means is of such a form that the mandrel is maintained stationary in space and the annular guide is so supported that it can be caused to traverse to and fro along the length of the mandrel.

Preferably, also, the mandrel is so supported that, where necessary, it can be wholly or partially rotated about its longitudinal axis either between longitudinal passes of the annular guide, or, where it is required to apply the longitudinally extending fibres with a long lay, as hereinbefore defined, during passage of the annular guide.

The mandrel-support means is also preferably of such form that the mandrel can be supported with its axis substantially vertical. The apparatus may also include means for rotating a mandrel, when so supported, about its axis.

The invention is further illustrated by a description, by way of example, of the preferred substantially rigid electromagnetic waveguide and of the preferred apparatus for and method of manufacturing the waveguide with reference to the accompanying drawings, in which:

FIG. 1 is a fragmental cross-sectional side view of the electromagnetic waveguide, and FIG. 2 is a side view, partly in section and partly in elevation, of the preferred apparatus for applying a plurality of glass fibre rovings lengthwise to a substantially rigid mandrel.

The waveguide shown in FIG. 1 is of circular cross-section and comprises a layer 1 of closely wound helical turns of enamel-coated copper wire, a plurality of layers 2 of resin-bonded glass fibre rovings which extend substantially parallel to the axis of the waveguide, a layer 3 of resin-bonded glass fibre rovings applied helically about the waveguide, a thin metal moisture barrier 4, and an outermost protective covering 5 comprising a plurality of layers of helically applied resin-bonded glass fibre tape.

In the apparatus shown in FIG. 2, a rigid tubular mandrel 10 of circular cross-section is supported with its axis substantially vertical. An annular guide 12 for directing a plurality of glass fibre rovings 13 (of which two only are shown) lengthwise of the mandrel is arranged to travel to and fro along the length of the mandrel. The guide 12, which has circumferentially spaced apertures 14 in its peripheral wall for passage of the glass fibre rovings 13, is supported on a substantially rigid shaft (not shown) extending parallel to the mandrel and can be driven to and fro along the length of the shaft by a chain drive.

At the lower end of the mandrel 10 is a tubular plug 15 which, at one end 16, is shaped to make a tight fit in the bore of the mandrel and which, at the other end, has projecting from it a plurality of circumferentially spaced fingers 17. Detachably secured to the mandrel 10 at its upper end is a collar 18 from which project a plurality of circumferentially spaced fingers 19.

In applying a plurality of longitudinally extending glass fibre rovings 13 to a mandrel 10, which has an overlying layer 1 of closely wound helical turns of enamel-coated copper wire, using the apparatus shown in FIG. 2, the mandrel is supported substantially vertically and the leading ends 21 of the plurality of glass fibre rovings 13 are fed through the apertures 14 of the annular guide 12 and through the bore of the tubular plug 15. A plastics tube 22 is fitted in the bore of the plug 15 to clamp the leading ends 21 against the wall of the bore of the plug and the protruding extremities of the leading ends are secured in the plug by adhesive. The plug 15 is then introduced into the lower end of the mandrel 10.

The annular guide 12 is now driven up the mandrel 10 to apply a layer of longitudinally extending glass fibre rovings 13 to the layer 1 of helically wound copper wires and is caused to travel beyond the collar 18, glass fibre rovings passing between adjacent fingers 19 of the collar.

The mandrel 10 is now partially rotated about its axis with respect to the annular guide 12 and the direction of travel of the guide is reversed. In the return passage of the guide 12 past the collar 18, the glass fibre rovings 13 pass between other adjacent fingers 19 of the collar so that the glass fibre rovings are looped about the fingers and are thereby retained at the upper end of the mandrel. The guide 12 is caused to travel beyond the lower end of the plug 15 where it is stopped and the glass fibre rovings passing between adjacent fingers 17 of the plug are bound about the protruding lower end of the plastics tube 22. The mandrel 10 is again partially rotated about is axis with respect to the guide 12 so that when the guide travels upwardly again the glass fibre rovings are looped about the fingers 17 and these two passes of the annular guide are repeated until a reinforcing wall of longitudinally extending glass fibre rovings of the required thickness has been built up.

The glass fibre rovings 13 are then cut at a point beyond the bound lower ends and the reinforcing wall so formed is impregnated with resin. Two layers of helically wound resin-impregnated glass fibre rovings, one of opposite hand to the other, are applied and a sheet of aluminium is folded around the reinforcing wall so formed to form the moisture barrier 4. Layers of resin-bonded glass fibre tape are helically applied about the barrier 4 to form the outermost protective covering 5 and the mandrel is then removed to an oven for curing of the resin.

Ends of the longitudinally extending glass fibre rovings protruding from the waveguide so formed at each end of the mandrel 10 are now cut, the plug 15 and collar 18 are removed and the mandrel is extracted from the waveguide. The waveguide is then trimmed to the required predetermined length.

The method and apparatus of the present invention are especially, but not exclusively, suitable for use in the method and apparatus for manufacturing substantially rigid electromagnetic waveguides as described in the specification of our copending U.S. Patent application Ser. No. 562,000 now U.S. Pat. No. 3,962,781 filed on the same day as the present Application.

What we claim as our invention is:

1. An electromagnetic waveguide comprising a circumferential electrically conductive layer and, surrounding the electrically conductive layer, a reinforcing wall comprising at least one layer of reinforcing elements bonded with resin, wherein reinforcing elements of said layer of the reinforcing wall extend substantially parallel to the axis of the waveguide throughout substantially the whole of its length.

2. An electromagnetic waveguide comprising a circumferential electrically conductive layer and, surrounding the electrically conductive layer, a reinforcing wall comprising at least one layer of reinforcing elements bonded with resin, wherein reinforcing elements of said layer of the reinforcing wall extend lengthwise throughout substantially the whole length of the waveguide and make less than half a helical turn per meter of a manufactured length of waveguide.

3. An electromagnetic waveguide as claimed in claim 2, in which the reinforcing wall comprises a plurality of layers of reinforcing elements, wherein in at least the outermost layer of the reinforcing wall reinforcing elements extend helically about the waveguide, thereby to bind the underlying longitudinally extending reinforcing elements to the circumferential electrically conductive layer.

4. An electromagnetic waveguide as claimed in claim 3, in which there are at least two outer layers of helically wound reinforcing elements, wherein the reinforcing elements of adjacent layers of helically wound reinforcing elements have directions of lay of opposite hand.

5. An electromagnetic waveguide as claimed in claim 2, wherein the reinforcing elements are glass fibres.

6. An electromagnetic waveguide as claimed in claim 2, wherein an electrically conductive material is incorporated in the resin of at least the innermost layer of the reinforcing wall.

* * * * *